US012631525B2

(12) United States Patent
Mark et al.

(10) Patent No.: US 12,631,525 B2
(45) Date of Patent: May 19, 2026

(54) TESTING SECONDARY POWER SYSTEM OF AIRCRAFT POWERPLANT

(71) Applicant: Pratt & Whitney Canada Corp., Longueuil (CA)

(72) Inventors: Michael Mark, Montreal (CA); Michael Hanna, Beaconsfield (CA)

(73) Assignee: Pratt & Whitney Canada Corp., Longueuil (CA)

( * ) Notice: Subject to any disclaimer, the term of this patent is extended or adjusted under 35 U.S.C. 154(b) by 389 days.

(21) Appl. No.: 18/214,237

(22) Filed: Jun. 26, 2023

(65) Prior Publication Data

US 2024/0426708 A1 Dec. 26, 2024

(51) Int. Cl.
*G01M 15/14* (2006.01)
*F02C 9/42* (2006.01)
*F02C 6/20* (2006.01)

(52) U.S. Cl.
CPC .............. G01M 15/14 (2013.01); F02C 9/42 (2013.01); *F02C 6/20* (2013.01); *F05D 2260/83* (2013.01)

(58) Field of Classification Search
CPC .................................................... G01M 15/14
See application file for complete search history.

(56) References Cited

U.S. PATENT DOCUMENTS 4,815,277 A 3/1989 Vershure, Jr.
7,624,592 B2 12/2009 Lui

| | | |
|---|---|---|
| 11,143,142 B2 | 10/2021 | Hanrahan |
| 11,519,337 B2 | 12/2022 | Redford |
| 2007/0238059 A1 | 10/2007 | Garay |
| 2017/0122222 A1* | 5/2017 | Punjala ..................... F23R 3/28 |
| 2019/0195133 A1* | 6/2019 | Wright ..................... F02C 7/26 |
| 2020/0056497 A1 | 2/2020 | Terwilliger |
| 2021/0016888 A1 | 1/2021 | Terwilliger |
| 2021/0071590 A1* | 3/2021 | Beita ......................... F02C 9/32 |
| 2021/0388775 A1 | 12/2021 | Thatcher |
| 2022/0234748 A1* | 7/2022 | Mark ..................... B64D 31/18 |
| 2022/0243667 A1 | 8/2022 | Rambo |
| 2022/0333534 A1 | 10/2022 | Smith |
| 2023/0015930 A1 | 1/2023 | Meshkin Fam |
| 2023/0085551 A1 | 3/2023 | Dussault |
| 2024/0425188 A1* | 12/2024 | Mark ..................... B64D 27/33 |
| 2024/0426253 A1* | 12/2024 | Mark ......................... F02C 9/34 |

OTHER PUBLICATIONS

EP Search Report for EP Patent Application No. 24184644.3 dated Dec. 4, 2024.

* cited by examiner

*Primary Examiner* — Eric S. McCall
(74) *Attorney, Agent, or Firm* — Getz Balich LLC

(57) ABSTRACT

A method of operation is provided. During this method, a first power system of an aircraft powerplant is operated to direct a first quantity of fuel into a flowpath of the aircraft powerplant for combustion. A second power system of the aircraft powerplant is tested during the operating of the first power system. The testing of the second power system includes: signaling the second power system to direct a second quantity of fuel into the flowpath for combustion; determining an operational parameter of the aircraft power-plant following the signaling; and evaluating operability of the second power system by comparing the operational parameter to a threshold.

19 Claims, 5 Drawing Sheets

500

502 Operate aircraft powerplant in first mode

504 Test secondary power system / secondary fuel system

504A Signal the secondary power system / the secondary fuel system to operate in second mode 504B Determine operational parameter of the aircraft powerplant 504C Evaluate operability of the secondary power system / the secondary fuel system

TESTING SECONDARY POWER SYSTEM OF AIRCRAFT POWERPLANT

TECHNICAL FIELD

This disclosure relates generally to an aircraft powerplant and, more particularly, to testing a power system of the aircraft powerplant.

BACKGROUND INFORMATION

Various methods and systems are known in the art for testing systems of an aircraft powerplant such as a gas turbine engine. While these known testing methods and systems have various advantages, there is still room in the art for improvement.

SUMMARY

According to an aspect of the present disclosure, a method of operation is provided. During this method, a first power system of an aircraft powerplant is operated to direct a first quantity of fuel into a flowpath of the aircraft powerplant for combustion. A second power system of the aircraft powerplant is tested during the operating of the first power system. The testing of the second power system includes: signaling the second power system to direct a second quantity of fuel into the flowpath for combustion; determining an operational parameter of the aircraft powerplant following the signaling; and evaluating operability of the second power system by comparing the operational parameter to a threshold.

According to another aspect of the present disclosure, another method of operation is provided. During this method, a first quantity of fuel is directed into a flowpath of an aircraft powerplant for combustion using a first fuel system of the aircraft powerplant. A second fuel system of the aircraft powerplant is tested during the directing of the first quantity of fuel using the first fuel system. The second fuel system is independent of the first fuel system. The testing of the second fuel system includes: signaling the second fuel system to direct a second quantity of fuel into the flowpath for combustion; and monitoring operation of the aircraft powerplant following the signaling to evaluate operability of the second fuel system.

According to still another aspect of the present disclosure, another method of operation is provided. During this method, a first power system of an aircraft powerplant is operated at a first power setting. The first power system is adjusted to operate at a second power setting that is less than the first power setting. The operating of the first power system at the second power setting includes directing a first quantity of fuel into a flowpath of the aircraft powerplant for combustion. A second power system of the aircraft powerplant is operated during the operating of the first power system at the second power setting. The operating of the second power system includes directing a second quantity of fuel into the flowpath for combustion. The second power system is operationally independent of the first power system.

The monitoring of the operation of the aircraft powerplant may include: determining an operational parameter of the aircraft powerplant following the signaling; and processing the operational parameter to evaluate operability of the second fuel system.

The method may also include driving rotation of a turbine rotor with combustion products generated by the combustion of the first quantity of fuel.

The operational parameter may be indicative of power output by the aircraft powerplant.

The operational parameter may be indicative of propulsor rotor rotational velocity.

The operational parameter may be indicative of a pressure ratio of the aircraft powerplant.

The operational parameter may be indicative of torque output by the aircraft powerplant.

The threshold may include an expected value of the operational parameter.

The method may also include determining the second power system has a fault where the operational parameter is less than the expected value.

The threshold may include an expected operating range for the operational parameter.

The method may also include determining the second power system has a fault where the operational parameter is outside of the expected operating range.

The first power system may be operated at a constant power and/or a constant torque setting during the testing of the second power system.

The method may also include driving an un-ducted propulsor rotor using the aircraft powerplant during the operating of the first power system.

The method may also include driving a ducted propulsor rotor using the aircraft powerplant during the operating of the first power system.

An aircraft may include the aircraft powerplant. The testing of the second power system may be performed while the aircraft is in flight.

The first power system may direct the first quantity of fuel into a first combustion zone along the flowpath. The second power system may be configured to direct the second quantity of fuel into a second combustion zone along the flowpath downstream of the first combustion zone.

The aircraft powerplant may include a heat engine and an inter-burner outside of the heat engine. The first combustion zone may be located within the heat engine. The second combustion zone may be located within the inter-burner.

The first power system may direct the first quantity of fuel into a first combustion zone along the flowpath. The second power system may be configured to direct the second quantity of fuel into the first combustion zone.

The aircraft powerplant may include a turbine section. The first power system may direct the first quantity of fuel into the flowpath upstream of a turbine rotor within the turbine section. The second power system may be configured to direct the second quantity of fuel into the flowpath upstream of the turbine rotor.

The aircraft powerplant may be configured as or otherwise include a turbo-compounded intermittent internal combustion engine.

The aircraft powerplant may be configured as or otherwise include a gas turbine engine.

The present disclosure may include any one or more of the individual features disclosed above and/or below alone or in any combination thereof.

The foregoing features and the operation of the invention will become more apparent in light of the following description and the accompanying drawings.

DETAILED DESCRIPTION

Figure 1:
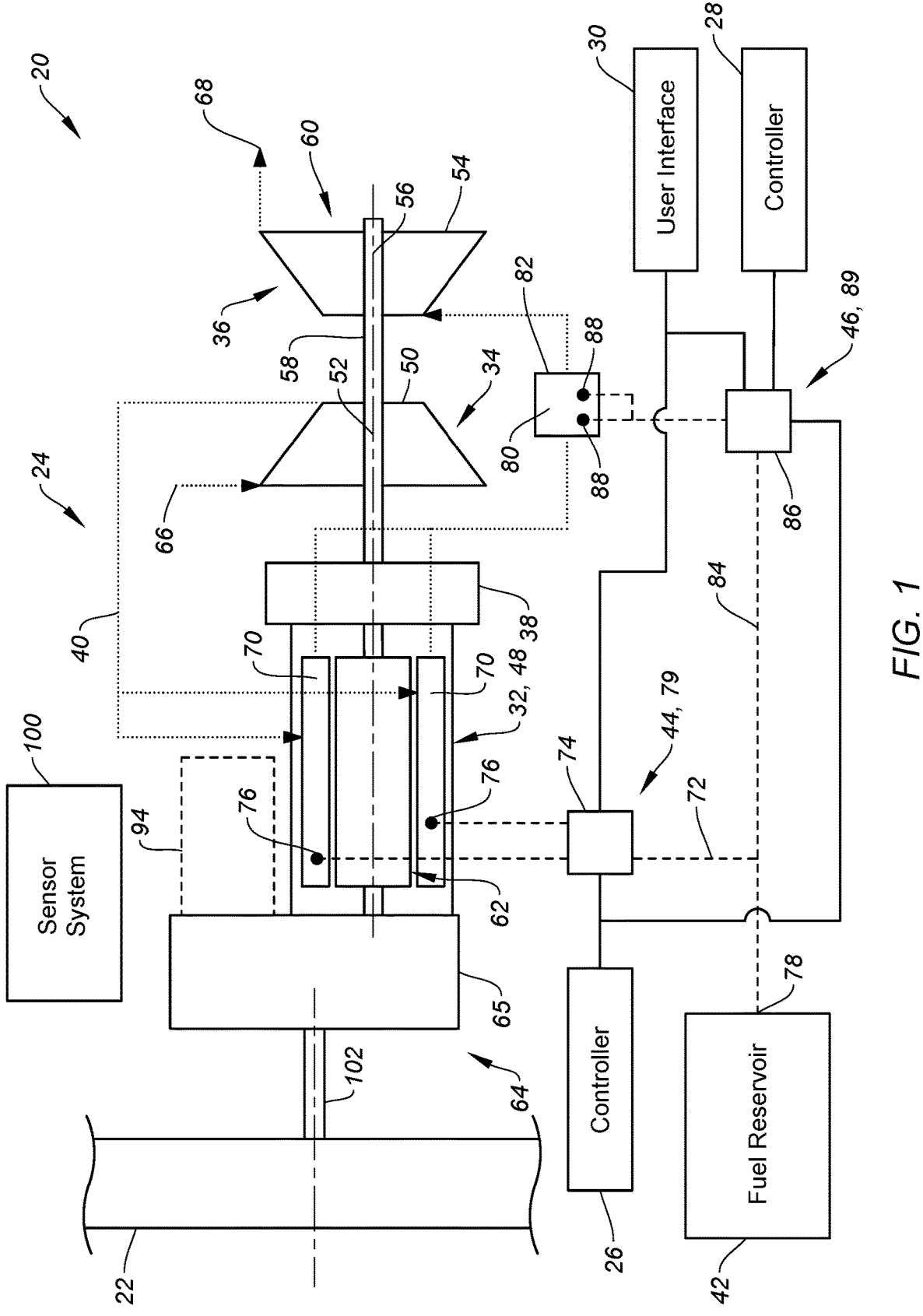
FIG. 1 is a partial schematic illustration of an aircraft powerplant with an intermittent internal combustion engine.

FIG. 1 illustrates a propulsion system 20 for an aircraft. The aircraft may be a fixed wing aircraft (e.g., an airplane), a rotorcraft (e.g., a helicopter), a drone (e.g., an unmanned aerial vehicle (UAV)) or any other manned or unmanned aerial vehicle or system. The aircraft propulsion system 20 of FIG. 1 includes a propulsor rotor 22 and an aircraft powerplant 24 configured to drive rotation of the propulsor rotor 22. The aircraft propulsion system 20 also includes a control system for controlling operation of the aircraft propulsion system 20 and its aircraft powerplant 24. This control system of FIG. 1 includes a primary (e.g., main) controller 26, a secondary (e.g., backup, supplemental, emergency, etc.) controller 28 and a user interface 30.

The propulsor rotor 22 is an air mover operable to generate thrust and/or lift for the aircraft. This propulsor rotor 22 may be configured as an open, un-ducted propulsor rotor or a ducted propulsor rotor. Examples of the un-ducted propulsor rotor include a propeller rotor for a propeller (e.g., turboprop) propulsion system, a rotorcraft rotor (e.g., a main helicopter rotor) for a rotorcraft (e.g., turboshaft) propulsion system, a propfan rotor for a propfan propulsion system and a pusher fan rotor for a pusher fan propulsion system. Examples of the ducted propulsor rotor include a fan rotor for a turbofan propulsion system and a (e.g., first stage) compressor rotor for a turbojet propulsion system. The present disclosure, however, is not limited to the foregoing exemplary un-ducted and ducted propulsor rotors. The propulsor rotor 22 of FIG. 1 includes a propulsor rotor base (e.g., a disk or a hub) and a plurality of propulsor rotor blades (e.g., airfoils). The propulsor rotor blades are arranged circumferentially around the propulsor rotor base in an array. Each of the propulsor rotor blades is connected to (e.g., formed integral with or mechanically fastened, welded, brazed and/or otherwise attached to) and projects radially out from the propulsor rotor base.

The aircraft powerplant 24 may be configured as a turbo-compounded heat engine. The aircraft powerplant 24 of FIG. 1, for example, includes a heat engine 32, a powerplant compressor section 34, a powerplant turbine section 36 and a powerplant geartrain 38; e.g., a turbine gearbox. The aircraft powerplant 24 also includes a powerplant flowpath 40, a fuel reservoir 42, a primary (e.g., main) fuel system 44 and a secondary (e.g., backup, supplemental, auxiliary, emergency, etc.) fuel system 46.

The heat engine 32 may be configured as or otherwise include an intermittent internal combustion (IC) engine 48 ("intermittent combustion engine"). The intermittent combustion engine 48 is an internal combustion (IC) engine in which a mixture of fuel and air is intermittently (e.g., periodically) detonated within the engine. Examples of the intermittent combustion engine 48 include, but are not limited to, a reciprocating piston engine (e.g., an inline (I) engine, a V-engine, a W-engine, etc.), a rotary engine (e.g., a Wankel engine), a rotating detonation engine and a pulse detonation engine. The present disclosure, however, is not limited to intermittent combustion engine applications.

The compressor section 34 includes a bladed compressor rotor 50. This compressor rotor 50 may be configured as a radial flow compressor rotor; e.g., an axial inflow-radial outflow compressor rotor, a centrifugal compressor rotor, a compressor impeller, etc. Alternatively, the compressor rotor 50 may be configured as an axial flow compressor rotor; e.g., an axial inflow-axial outflow compressor rotor. Still alternatively, the compressor rotor 50 may include a combination of radial flow and axial flow stages. The compressor rotor 50 of FIG. 1 includes a compressor rotor base (e.g., a disk or a hub) and a plurality of compressor rotor blades (e.g., airfoils, vanes, etc.). The compressor rotor blades are arranged circumferentially around the compressor rotor base in an array. Each of the compressor rotor blades is connected to (e.g., formed integral with or mechanically fastened, welded, brazed and/or otherwise attached to) and projects radially out from the compressor rotor base. The compressor rotor 50 is rotatable about a compressor axis 52.

The turbine section 36 includes a bladed turbine rotor 54. This turbine rotor 54 may be configured as a radial flow turbine rotor; e.g., a radial inflow-axial outflow turbine rotor, a centrifugal turbine rotor, a turbine wheel, etc. Alternatively, the turbine rotor 54 may be configured as an axial flow turbine rotor; e.g., an axial inflow-axial outflow turbine rotor. Still alternatively, the turbine rotor 54 may include a combination of radial flow and axial flow stages. The turbine rotor 54 of FIG. 1 includes a turbine rotor base (e.g., a disk or a hub) and a plurality of turbine rotor blades (e.g., airfoils, vanes, etc.). The turbine rotor blades are arranged circumferentially around the turbine rotor base in an array. Each of the turbine rotor blades is connected to (e.g., formed integral with or mechanically fastened, welded, brazed and/or otherwise attached to) and projects radially out from the turbine rotor base. The turbine rotor 54 is rotatable about a turbine axis 56, which turbine axis 56 may be parallel (e.g., coaxial) with the compressor axis 52.

The turbine rotor 54 may be coupled to the compressor rotor 50 through an intermediate shaft 58. Here, at least (or only) the compressor rotor 50, the turbine rotor 54 and the intermediate shaft 58 may collectively form a rotating assembly 60; e.g., a spool. The rotating assembly 60 and its turbine rotor 54 may also be coupled to an internal rotating assembly 62 of the heat engine 32 (e.g., the intermittent combustion engine 48) through the powerplant geartrain 38 (or otherwise).

The aircraft powerplant 24 and its heat engine 32 are operatively coupled to the propulsor rotor 22. The rotating assembly 62 of FIG. 1, for example, is coupled to and rotatable with the propulsor rotor 22 through a propulsor drivetrain 64. This propulsor drivetrain 64 may be configured as a geared drivetrain, where a propulsor geartrain 65 (e.g., a transmission, a speed change device, an epicyclic geartrain, etc.) is disposed between and operatively couples the propulsor rotor 22 to the rotating assembly 62. With this arrangement, the propulsor rotor 22 may rotate at a different (e.g., slower) rotational velocity than the rotating assembly 62. However, the propulsor drivetrain 64 may alternatively be configured as a direct drive drivetrain, where the propulsor geartrain 65 is omitted. With this arrangement, the propulsor rotor 22 rotates at a common (the same) rotational velocity as the rotating assembly 62.

The powerplant flowpath 40 of FIG. 1 extends longitudinally from an airflow inlet 66 into the powerplant flowpath 40, sequentially through the compressor section 34, the heat engine 32 and the turbine section 36, to a combustion products exhaust 68 from the powerplant flowpath 40. The flowpath inlet 66 may also be an airflow inlet into the aircraft powerplant 24. The flowpath exhaust 68 may also be a combustion products exhaust from the aircraft powerplant 24.

The fuel reservoir 42 is configured to store fuel before, during and/or after aircraft powerplant operation. The fuel reservoir 42, for example, may be configured as or otherwise include a tank, a cylinder, a pressure vessel, a bladder or any other type of fuel storage container.

The primary fuel system 44 is configured to deliver primary fuel (e.g., a quantity of the fuel from the fuel reservoir 42) to one or more primary combustion zones 70 within the aircraft powerplant 24. Each primary combustion zone 70 of FIG. 1 is located within the heat engine 32, and may be formed by a respective portion of the powerplant flowpath 40. Each primary combustion zone 70, for example, may be configured as or otherwise include a (e.g., axial flow, a reverse flow, etc.) combustion chamber, a piston bore and/or the like within the heat engine 32.

The primary fuel system 44 of FIG. 1 includes a primary fuel circuit 72, a primary fuel flow regulator 74 and one or more primary fuel injectors 76. The primary fuel circuit 72 of FIG. 1 is fluidly coupled with an outlet 78 of the fuel reservoir 42. This primary fuel circuit 72 extends longitudinally through the primary fuel flow regulator 74 to the primary fuel injectors 76. The primary fuel circuit 72 thereby fluidly couples the fuel reservoir 42 and its reservoir outlet 78 to the primary fuel injectors 76, through the primary fuel flow regulator 74. The primary fuel flow regulator 74 is configured to selectively direct and/or meter a flow of the fuel—the primary fuel—from the fuel reservoir 42 to one or more of the primary fuel injectors 76. The primary fuel flow regulator 74, for example, may be configured as or otherwise include a fuel pump and/or a valve (or valve system). The primary fuel injectors 76 are arranged with (e.g., on, along, in, etc.) the primary combustion zones 70. These primary fuel injectors 76 are configured to direct (e.g., inject) the primary fuel into the primary combustion zones 70 to mix with compressed air for subsequent combustion. With this arrangement, the primary fuel system 44 may be configured as or otherwise included as part of a primary (e.g., main) power system 79 for the aircraft powerplant 24.

The secondary fuel system 46 is configured to deliver secondary fuel (e.g., another quantity of the fuel from the fuel reservoir 42) to at least (or only) one secondary combustion zone 80 within the aircraft powerplant 24. The secondary combustion zone 80 of FIG. 1 is located outside of the heat engine 32, and may be formed by a respective portion of the powerplant flowpath 40. The secondary combustion zone 80, for example, may be configured as or otherwise include a combustion volume and/or the like within an inter-burner 82 of the aircraft powerplant 24. This inter-burner 82 and its secondary combustion zone 80 are arranged fluidly along the powerplant flowpath 40 between the primary combustion zones 70 and the turbine rotor 54. The inter-burner 82 of FIG. 1 and its secondary combustion zone 80, for example, are arranged fluidly along the powerplant flowpath 40 between the heat engine 32 and the turbine section 36. The present disclosure, however, is not limited to such an exemplary arrangement. The inter-burner 82 and its secondary combustion zone 80, for example, may alternatively be integrated into the heat engine 32, for example downstream of the primary combustion zones 70. In another example, the secondary fuel system 46 and the primary fuel system 44 may alternatively independently direct the secondary fuel and the primary fuel into a common (the same) combustion zone; e.g., a combustion chamber.

The secondary fuel system 46 of FIG. 1 includes a secondary fuel circuit 84, a secondary fuel flow regulator 86 and one or more secondary fuel injectors 88. The secondary fuel circuit 84 of FIG. 1 is fluidly coupled with the reservoir outlet 78. This secondary fuel circuit 84 extends longitudinally through the secondary fuel flow regulator 86 to the secondary fuel injectors 88. The secondary fuel circuit 84 thereby fluidly couples the fuel reservoir 42 and its reservoir outlet 78 to the secondary fuel injectors 88, through the secondary fuel flow regulator 86. The secondary fuel flow regulator 86 is configured to selectively direct and/or meter a flow of the fuel—the secondary fuel—from the fuel reservoir 42 to one or more of the secondary fuel injectors 88. The secondary fuel flow regulator 86, for example, may be configured as or otherwise include a fuel pump and/or a valve (or valve system). The secondary fuel injectors 88 are arranged with (e.g., on, along, in, etc.) the secondary combustion zone 80. These secondary fuel injectors 88 are configured to direct (e.g., inject) the secondary fuel into the secondary combustion zone 80 to mix with compressed air for subsequent combustion. With this arrangement, the secondary fuel system 46 may be configured as or otherwise included as part of a secondary (e.g., supplemental, auxiliary, backup, etc.) power system 89 for the aircraft powerplant 24.

Figure 2:
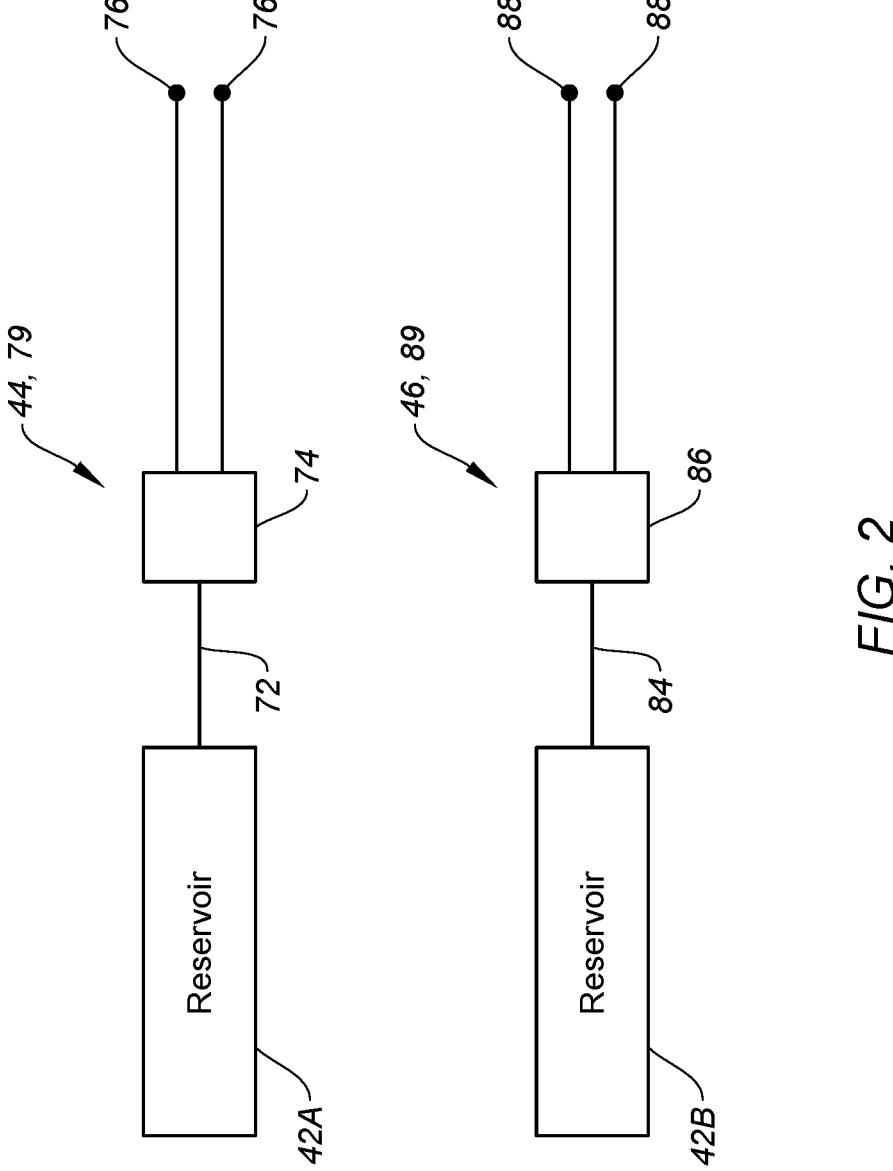
FIG. 2 is a schematic illustration of multiple independent fuel systems each with its own dedicated fuel reservoir.

While the primary fuel system 44 and the secondary fuel system 46 of FIG. 1 are both fluidly coupled to the same fuel reservoir 42 (e.g., in parallel), these powerplant fuel systems 44 and 46 and, more generally, the powerplant power systems 79 and 89 may be fluidly and/or operably independent. The primary fuel system 44 of FIG. 1, for example, is fluidly coupled to the fuel reservoir 42 and its reservoir outlet 78 independent of (e.g., not through) the secondary fuel system 46. Similarly, the secondary fuel system 46 of FIG. 1 is fluidly coupled to the fuel reservoir 42 and its reservoir outlet 78 independent of the primary fuel system 44. Moreover, each primary fuel system member 72, 74, 76 of FIG. 1 is discrete and operably independent of each secondary fuel system member 84, 86, 88. Similarly, each secondary fuel system member 84, 86, 88 of FIG. 1 is discrete and operably independent of each primary fuel system member 72, 74, 76. With such an arrangement, the primary fuel system 44 is operable to direct the primary fuel from the fuel reservoir 42 to its primary fuel injectors 76 even where the secondary fuel system 46 is non-operation and/or inoperable; e.g., damaged, plugged, etc. Similarly, the secondary fuel system 46 is operable to direct the secondary fuel from the fuel reservoir 42 to its secondary fuel injectors 88 even where the primary fuel system 44 is non-operation and/or inoperable; e.g., damaged, plugged, etc. Of course, referring to FIG. 2, it is further contemplated each powerplant fuel system 44, 46 may alternatively be configured with its own dedicated fuel reservoir 42A, 42B. Here, the fuels stored within the fuel reservoirs 42A and 42B may be the same type of fuel, or different types of fuel.

The primary controller 26 of FIG. 1 is configured to control operation of the primary fuel system 44 and, more generally, the primary power system 79. This primary controller 26 may also (or may not) be configured to control operation of the secondary fuel system 46 and, more generally, the secondary power system 89. The primary controller 26 of FIG. 1, for example, is in signal communication with (e.g., hardwired and/or wirelessly coupled to) the primary fuel system 44 and its primary fuel flow regulator 74 and the secondary fuel system 46 and its secondary fuel flow regulator 86. Here, the primary controller 26 may be configured as a main onboard powerplant controller; e.g., an electronic engine controller (EEC), an electronic control unit (ECU), a full-authority digital engine controller (FADEC), etc.

The secondary controller 28 of FIG. 1 is configured to control operation of the secondary fuel system 46 and, more generally, the secondary power system 89. The secondary controller 28 of FIG. 1, for example, is in signal communication with the secondary fuel system 46 and its secondary fuel flow regulator 86. Here, the secondary controller 28 may be configured as a backup, supplemental, auxiliary and/or emergency onboard powerplant controller.

While the primary controller 26 and the secondary controller 28 of FIG. 1 are both in signal communication with and configured to control operation of the secondary fuel system 46, these powerplant controllers 26 and 28 may be independent from one another. The primary controller 26 and the secondary controller 28, for example, may be configured as different electronic devices and may even be located remote from one another within the aircraft powerplant 24. Moreover, the primary controller 26 and the secondary controller 28 may be independently electrically coupled to/in signal communication with the secondary fuel system 46. With such an arrangement, the primary controller 26 is operable to control the primary fuel system 44 and/or the secondary fuel system 46 even where the secondary controller 28 is non-operation and/or inoperable. Similarly, the secondary controller 28 is operable to control the secondary fuel system 46 even where the primary controller 26 is non-operational and/or inoperable.

Figure 3:
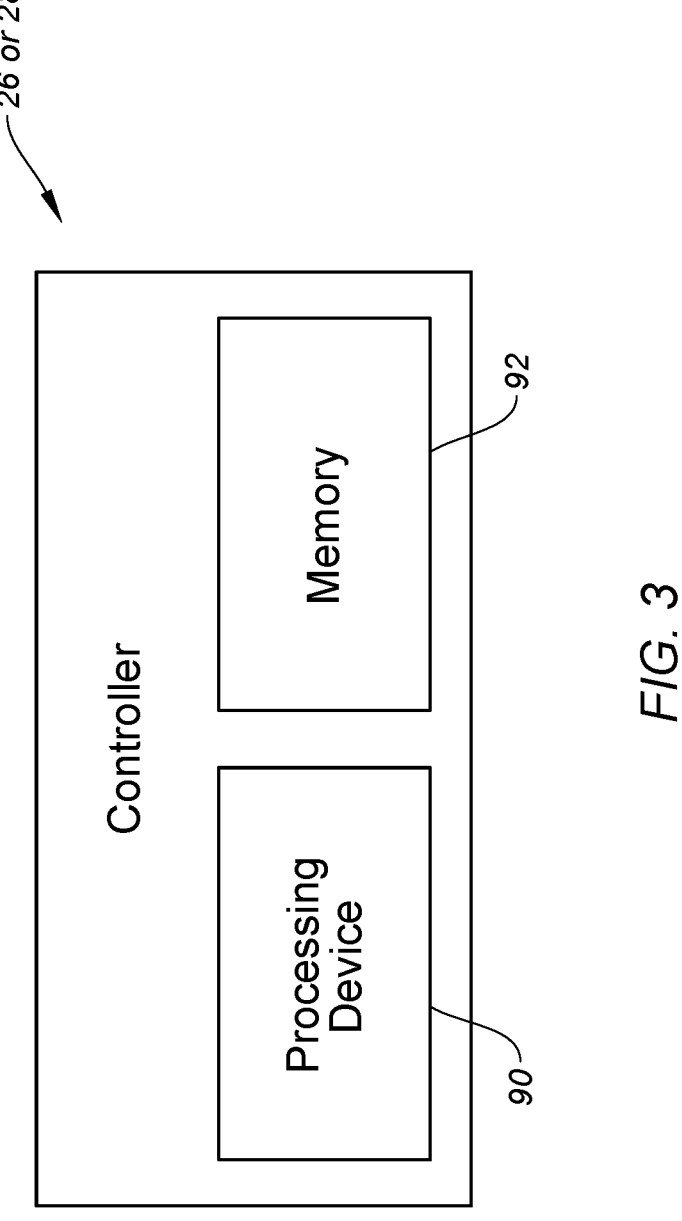
FIG. 3 is a schematic illustration of a controller.

Referring to FIG. 3, each powerplant controller 26, 28 may be implemented with a combination of hardware and software. The hardware may include at least one processing device 90 and memory 92. The processing device 90 may include one or more single-core and/or multi-core processors. The hardware may also or alternatively include analog and/or digital circuitry other than that described above. The memory 92 is configured to store software (e.g., program instructions) for execution by the processing device 90, which software execution may control and/or facilitate performance of one or more operations such as those described below. The memory 92 may be a non-transitory computer readable medium. For example, the memory 92 may be configured as or include a volatile memory and/or a non-volatile memory. Examples of a volatile memory may include a random access memory (RAM) such as a dynamic random access memory (DRAM), a static random access memory (SRAM), a synchronous dynamic random access memory (SDRAM), a video random access memory (VRAM), etc. Examples of a nonvolatile memory may include a read only memory (ROM), an electrically erasable programmable read-only memory (EEPROM), a computer hard drive, etc.

The user interface 30 may be in signal communication with the primary controller 26, for example independent of the secondary controller 28. The user interface 30 may be in signal communication with the secondary controller 28, for example independent of the primary controller 26. The user interface 30 may also or alternatively be in signal communication with the secondary fuel system 46, for example independent of the primary controller 26 and/or the secondary controller 28. With such an arrangement, the user interface 30 may provide personnel operating the aircraft powerplant 24/the aircraft (e.g., a pilot) manual control over use of the primary fuel system 44 and/or the secondary fuel system 46 under certain conditions. The user interface 30 may include one or more user interface devices such as, but not limited to, a switch panel, a throttle, a control knob, and the like.

The aircraft powerplant 24 of FIG. 1 is configured to operate in various modes of operation. During a first mode, the aircraft powerplant 24 may operate using (e.g., only) the primary fuel system 44. Here, the secondary fuel system 46 may be non-operation; e.g., turned off. This first mode may be selected during normal aircraft flight; e.g., regular power operation, cruise, etc. During a second mode, the aircraft powerplant 24 may operate using the primary fuel system 44 and the secondary fuel system 46. This second mode may be selected during an emergency and/or when there is higher than normal power demand on the aircraft powerplant 24. The second mode may also be selected to test operability of the secondary fuel system 46 and, more generally, the secondary power system 89. While (e.g., ideally) both the primary fuel system 44 and the secondary fuel system 46 operate during the second mode, it is also contemplated the primary fuel system 44 may be non-operable and/or inoperable during the second mode where, for example, the primary fuel system 44 and/or the primary controller 26 is inoperable.

During the first mode, the primary controller 26 signals the primary fuel system 44 to deliver the primary fuel to the primary combustion zones 70. The primary fuel is mixed with compressed air within the primary combustion zones 70. This fuel-air mixture is ignited, and combustion products generated therefrom drive rotation of the rotating assembly 62 of the heat engine 32. The rotation of the rotating assembly 62 drives rotation of the propulsor rotor 22 through the propulsor drivetrain 64, and the rotating propulsor rotor 22 generates aircraft thrust and/or lift. The combustion products further flow out of the heat engine 32 into the turbine section 36 and drive rotation of the turbine rotor 54. The rotation of the turbine rotor 54 drives rotation of the compressor rotor 50, and the rotating compressor rotor 50 compresses air entering the aircraft powerplant 24 and its powerplant flowpath 40 through the flowpath inlet 66 to provide the compressed air to the heat engine 32. During this first mode of operation, the primary fuel system 44 (e.g., alone) may provide all fuel needed for aircraft powerplant operation.

During the second mode, the aircraft powerplant 24 may be operated substantially as described above during the first mode. However, during this second mode, the secondary controller 28 (or the primary controller 26, or the user interface 30) signals the secondary fuel system 46 to deliver the secondary fuel to the secondary combustion zone 80. The secondary fuel is mixed with leftover (e.g., un-reacted) air, as well as combustion products, entering the secondary combustion zone 80 from the heat engine 32. This fuel-air mixture is ignited, and combustion products generated therefrom along with the combustion products generated within the primary combustion zones 70 flow into the turbine section 36 and boost power for driving rotation of the turbine rotor 54. This may further boost power for driving the propulsor rotor 22 where, for example, the rotating assembly 60 is coupled to the propulsor rotor 22 through the powerplant geartrain 38, the rotating assembly 62 and the propulsor geartrain 65 as described above. During this second mode of operation, the primary fuel system 44 and the secondary fuel system 46 individually and independently provide all the fuel needed for aircraft powerplant operation. However, it is contemplated the secondary fuel system 46 (e.g., alone) may be capable of providing enough fuel for combustion within the aircraft powerplant 24 to facilitate (e.g., derated, or full) aircraft powerplant operation. The secondary fuel system 46, for example, may be configured to provide enough fuel to facilitate at least fifty percent (50%), sixty percent (60%), seventy percent (70%) or more (e.g., one hundred percent (100%)) aircraft powerplant operation; e.g., where the primary fuel system 44 is non-operational or inoperable. The secondary fuel system 46 may thereby function as a backup to the primary fuel system 44. By contrast, a typical pilot fuel system for a gas turbine engine is designed to provide about ten or twenty percent (10-20%) of fuel required for normal gas turbine engine operation.

In some embodiments, the aircraft powerplant 24 may be configured as an electric hybrid powerplant. The aircraft powerplant 24 of FIG. 1, for example, includes an electric motor 94 configured to further (e.g., selectively) drive rotation of the propulsor rotor 22. The propulsor drivetrain 64 of FIG. 1, for example, couples both the heat engine 32 and the electric motor 94 to the propulsor rotor 22.

Figure 4:
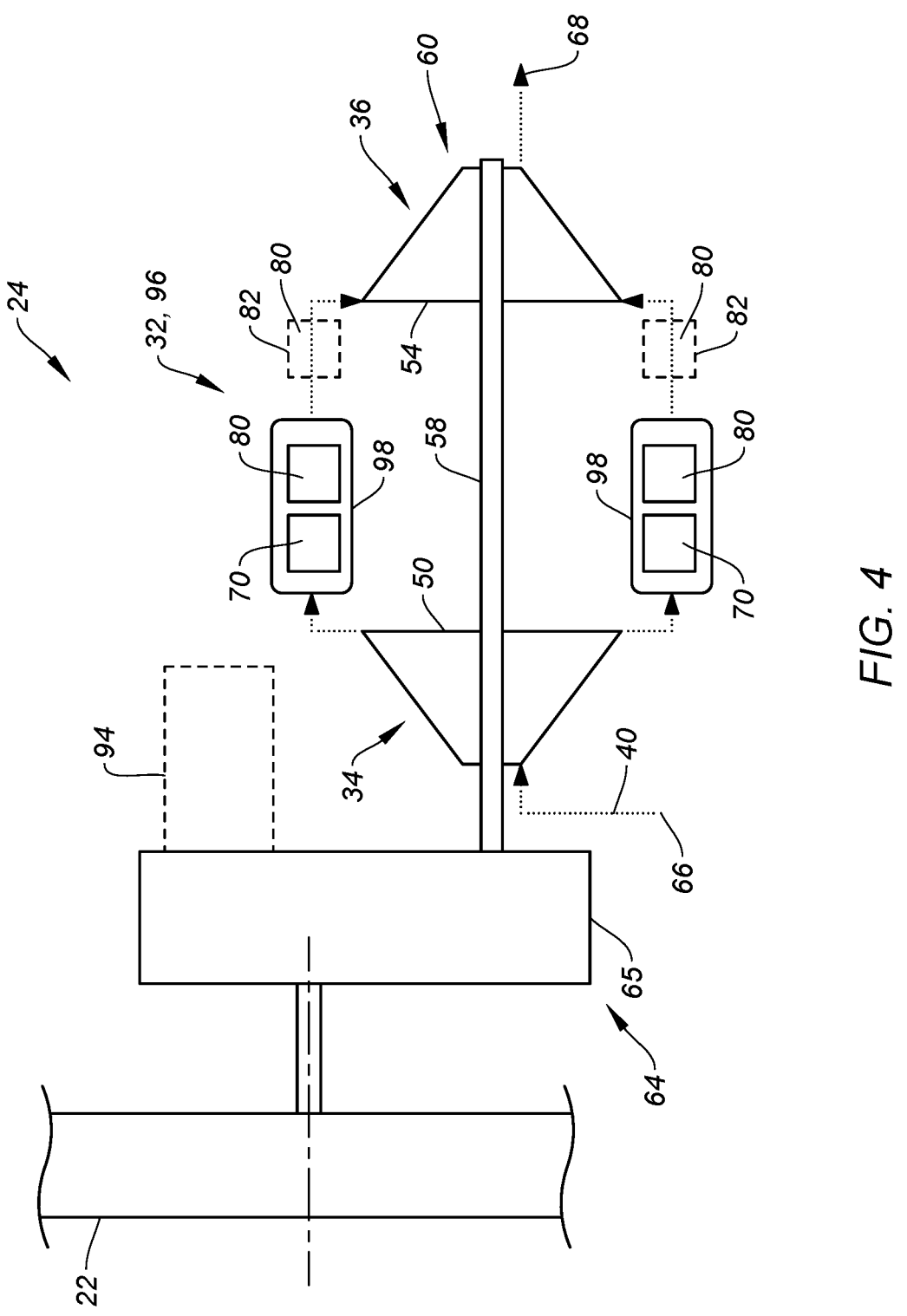
FIG. 4 is a partial schematic illustration of the aircraft powerplant with a continuous internal combustion engine.

While the heat engine 32 may be configured as an intermittent combustion engine (e.g., 48) as described above, the present disclosure is not limited to such applications. For example, referring to FIG. 4, the heat engine 32 and, more generally, the aircraft powerplant 24 may alternatively be configured as a continuous internal combustion engine such as, but not limited to, a gas turbine engine 96. With such an arrangement, both the primary combustion zone 70 and the secondary combustion zone 80 may be arranged at a common location—here, within a combustor 98 (e.g., an annular combustor) within the gas turbine engine 96. Of course, it is also contemplated the secondary combustion zone 80 may alternatively be disposed downstream of the primary combustion zone 70/the combustor 98; e.g., the secondary combustion zone 80 may be within the separate inter-burner 82. While the gas turbine engine 96 of FIG. 4 is shown as a single rotating assembly (e.g., spool) engine for ease of illustration, it is contemplated the gas turbine engine 96 may alternatively include two or more rotating assemblies; e.g., spools.

Figure 5:
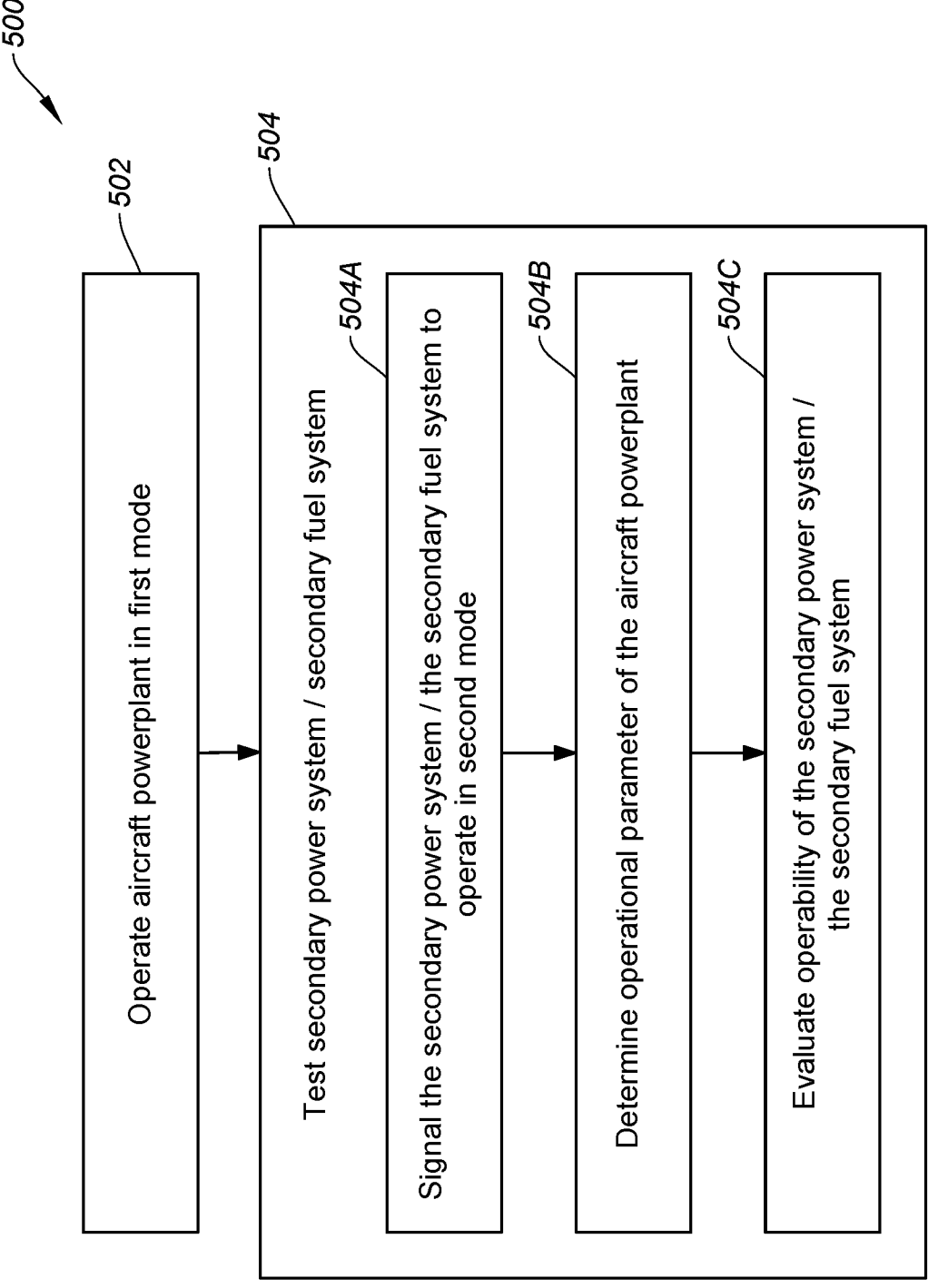
FIG. 5 is a flow diagram of a method of operation for an aircraft powerplant.

FIG. 5 illustrates a method 500 of operation for an aircraft powerplant. For ease of description, the operating method 500 is described below with reference to the aircraft powerplant of FIG. 1. The operating method 500 of the present disclosure, however, is not limited to such an exemplary aircraft powerplant.

In step 502, the aircraft powerplant 24 is operated in the first mode. During this first mode, the primary controller 26 may signal the primary power system 79 and its primary fuel system 44 to deliver the primary fuel to the primary combustion zones 70 for combustion, for example as described above.

In step 504, operability of the secondary power system 89 and its secondary fuel system 46 are tested. For example, in step 504A, the secondary controller 28 (or the primary controller 26, or the user interface 30) may signal the secondary fuel system 46 to deliver the secondary fuel to the secondary combustion zone 80 for combustion. Meanwhile, the primary power system 79 and its primary fuel system 44 may continue to supply the primary fuel to the primary combustion zones 70 for combustion. The secondary power system 89 and its secondary fuel system 46 may thereby be signaled to operate in the second mode along with the primary power system 79 and its primary fuel system 44, for example as described above.

In step 504B, an operational parameter of the aircraft powerplant 24 is determined; e.g., measured, calculated, modeled, estimated, etc. This operational parameter is determined following (e.g., temporally after) the signaling to the secondary power system 89 and its secondary fuel system 46 to deliver the secondary fuel to the secondary combustion zone 80. A sensor system 100, for example, may measure one or more powerplant parameters such as, but not limited to, shaft torque, shaft speed, shaft deflection, gas temperature, gas pressure, etc. Data associated with the one or more powerplant parameters may then be processed by the secondary controller 28 (or the primary controller 26, or still another controller for this testing) to determine the operational parameter. Alternatively, the sensor system 100 may directly measure the operational parameter. The operational parameter may be indicative of a (e.g., total) power output by the aircraft powerplant 24, a rotational velocity (e.g., speed) of the propulsor rotor 22, a pressure ratio of the aircraft powerplant 24, a (e.g., total) torque output by the aircraft powerplant 24, and/or the like. This operational parameter may be determined at various locations along the aircraft powerplant 24. For example, the operational parameter may be determined for the rotating assembly 62, a propulsor shaft 102 connecting the propulsor geartrain 65 to the propulsor rotor 22, etc.

In step 504C, the operability of the secondary power system 89 and its secondary fuel system 46 are evaluated. The secondary controller 28 (or the primary controller 26, or still another controller for this testing), for example, may compare the operational parameter to a threshold. This threshold may be a constant threshold. Alternatively, the threshold may be a variable threshold which changes based on, for example, environmental conditions, current aircraft powerplant power setting, etc. The threshold may be indicative of an expected value for the operational parameter determined in the step 504B. Alternatively, the threshold may be indicative of an expected operating range for the operational parameter determined in the step 504B. Herein, the term "expected" may describe a value the operational parameter would have, or an operating range in which the operational parameter would fall, where the secondary power system 89 and its secondary fuel system 46 are (e.g., fully) operational.

Where the threshold is an expected value, the secondary controller 28 (or the primary controller 26, or still another controller for this testing) may determine the secondary power system 89 and its secondary fuel system 46 are (e.g., fully) operational where the operational parameter is equal to or greater than the expected value. However, the secondary controller 28 (or the primary controller 26, or still another controller for this testing) may determine the secondary power system 89 and its secondary fuel system 46 have a fault where the operational parameter is less than the expected value. This fault may be a condition where the secondary power system 89 and its secondary fuel system 46 are operating below a minimum (e.g., required) level; e.g., a level below a design specification for the secondary power system 89 and its secondary fuel system 46. The fault may also or alternatively be a condition where the secondary power system 89 and its secondary fuel system 46 are inoperable; e.g., due to a malfunction, a clog, etc.

Where the threshold is an expected operating range, the secondary controller 28 (or the primary controller 26, or still another controller for this testing) may determine the secondary power system 89 and its secondary fuel system 46 are (e.g., fully) operational where the operational parameter is within the expected operating range. However, the secondary controller 28 (or the primary controller 26, or still another controller for this testing) may determine the secondary power system 89 and its secondary fuel system 46 have a fault where the operational parameter is outside of (e.g., less than, greater than) the expected operating range. Again, this fault may be a condition where the secondary power system 89 and its secondary fuel system 46 are operating below a minimum (e.g., required) level. The fault may also or alternatively be a condition where the secondary power system 89 and its secondary fuel system 46 are inoperable.

Where the fault in the operation of the secondary power system 89 and its secondary fuel system 46 is identified, the user interface 30 (and/or another device) may be utilized to inform the personnel operating the aircraft powerplant 24/the aircraft; e.g., the pilot. Information associated with the fault may also or alternatively be saved in a memory (e.g., the memory 92) for later retrieval by maintenance personnel or the like. Information may also or alternatively be saved associated with positive evaluations of the secondary power system 89 and its secondary fuel system 46. This information may then be used for certifications and the like.

The testing step 504 may be performed to test the secondary power system 89 and its secondary fuel system 46 at partial power or at full power. For example, during the testing, the secondary power system 89 and its secondary fuel system 46 may be signaled to direct the secondary fuel into the secondary combustion zone 80 at a minimum flowrate for the secondary fuel system 46 or at an intermediate flowrate for the secondary fuel system 46, which intermediate flowrate is between the minimum flowrate and a maximum flowrate for the secondary fuel system 46. Alternatively, during the testing, the secondary power system 89 and its secondary fuel system 46 may be signaled to direct the secondary fuel into the secondary combustion zone 80 at the maximum flowrate.

The testing step 504 may also be performed to test the secondary power system 89 and its secondary fuel system 46 while the primary power system 79 and its primary fuel system 44 are at partial or full power. For example, during the testing, the primary power system 79 and its primary fuel system 44 may be signaled to direct the primary fuel into the primary combustion zones 70 at a minimum flowrate for the primary fuel system 44 or at an intermediate flowrate for the primary fuel system 44, which intermediate flowrate is between the minimum flowrate and a maximum flowrate for the primary fuel system 44. To facilitate the testing step 504 with the primary power system 79 at the minimum or at the intermediate power setting, the primary controller 26 may signal the primary power system 79 to decrease its power setting/primary fuel flow prior to the testing step 504. Of course, in other embodiments, the primary power system 79 and its primary fuel system 44 may be signaled to direct the primary fuel into the primary combustion zones 70 at the maximum flowrate during the testing step 504.

In general, the primary power system 79 and its primary fuel system 44 may be maintained at a constant power and/or a constant torque setting/a constant fuel flowrate during the testing step 504. However, this power setting may gradually be increased as the power setting of the secondary power system 89 is gradually decreased following the testing step 504. In other words, the power settings of the primary power system 79 and the secondary power system 89 may be modulated and collectively timed to provide a relatively smooth power output following the testing; e.g., as the second power system 89 is depowered and turned off.

The operating method 500 and its testing step 504 may be performed while the aircraft is in flight. Alternatively, the operating method 500 and the testing step 504 may be performed while the aircraft is on ground.

In some embodiments, the testing step 504 may be performed periodically during aircraft powerplant operation; e.g., during an aircraft flight. In addition to testing the operability of the secondary power system 89 and its secondary fuel system 46, the periodic performance of the testing step 504 and, more generally, the operation of the secondary power system 89 and its secondary fuel system 46 reduces dormancy of the secondary power system 89 and its secondary fuel system 46. In general, reducing dormancy of the secondary power system 89 and its secondary fuel system 46 reduces likelihood of secondary power system/secondary fuel system faults.

While various embodiments of the present disclosure have been described, it will be apparent to those of ordinary skill in the art that many more embodiments and implementations are possible within the scope of the disclosure. For example, the present disclosure as described herein includes several aspects and embodiments that include particular features. Although these features may be described individually, it is within the scope of the present disclosure that some or all of these features may be combined with any one of the aspects and remain within the scope of the disclosure. Accordingly, the present disclosure is not to be restricted except in light of the attached claims and their equivalents.

What is claimed is:

1. A method of operation, comprising:
   operating a first power system of an aircraft powerplant to direct a first quantity of fuel into a flowpath of the aircraft powerplant for combustion; and
   testing a second power system of the aircraft powerplant during the operating of the first power system, the testing of the second power system comprising
   signaling the second power system to direct a second quantity of fuel into the flowpath for combustion;
   determining an operational parameter of the aircraft powerplant following the signaling; and
   evaluating operability of the second power system by comparing the operational parameter to a threshold.

2. The method of claim 1, wherein the operational parameter is indicative of power output by the aircraft powerplant.

3. The method of claim 1, wherein the operational parameter is indicative of torque output by the aircraft powerplant.

4. The method of claim 1, wherein the threshold comprises an expected value of the operational parameter.

5. The method of claim 4, further comprising determining the second power system has a fault where the operational parameter is less than the expected value.

6. The method of claim 1, wherein the threshold comprises an expected operating range for the operational parameter.

7. The method of claim 6, further comprising determining the second power system has a fault where the operational parameter is outside of the expected operating range.

8. The method of claim 1, wherein the first power system is operated at a constant power and/or a constant torque setting during the testing of the second power system.

9. The method of claim 1, further comprising driving an un-ducted propulsor rotor using the aircraft powerplant during the operating of the first power system.

10. The method of claim 1, further comprising driving a ducted propulsor rotor using the aircraft powerplant during the operating of the first power system.

11. The method of claim 1, wherein
   an aircraft comprises the aircraft powerplant; and
   the testing of the second power system is performed while the aircraft is in flight.

12. The method of claim 1, wherein the first power system directs the first quantity of fuel into a first combustion zone along the flowpath; and the second power system is configured to direct the second quantity of fuel into a second combustion zone along the flowpath downstream of the first combustion zone.

13. The method of claim 12, wherein the aircraft powerplant includes a heat engine and an inter-burner outside of the heat engine;

the first combustion zone is located within the heat engine; and the second combustion zone is located within the inter-burner.

14. The method of claim 1, wherein the first power system directs the first quantity of fuel into a first combustion zone along the flowpath; and the second power system is configured to direct the second quantity of fuel into the first combustion zone.

15. The method of claim 1, wherein the aircraft powerplant comprises a turbine section;

the first power system directs the first quantity of fuel into the flowpath upstream of a turbine rotor within the turbine section; and the second power system is configured to direct the second quantity of fuel into the flowpath upstream of the turbine rotor.

16. The method of claim 1, wherein the aircraft power-plant comprises a turbo-compounded intermittent internal combustion engine.

17. The method of claim 1, wherein the aircraft power-plant comprises a gas turbine engine.

18. A method of operation, comprising:

directing a first quantity of fuel into a flowpath of an aircraft powerplant for combustion using a first fuel system of the aircraft powerplant; and testing a second fuel system of the aircraft powerplant during the directing of the first quantity of fuel using the first fuel system, the second fuel system independent of the first fuel system, and the testing of the second fuel system comprising signaling the second fuel system to direct a second quantity of fuel into the flowpath for combustion; and monitoring operation of the aircraft powerplant following the signaling to evaluate operability of the second fuel system.

19. The method of claim 18, further comprising driving rotation of a turbine rotor with combustion products generated by the combustion of the first quantity of fuel.

* * * * *